(12) United States Patent
Li et al.

(10) Patent No.: US 8,089,583 B2
(45) Date of Patent: Jan. 3, 2012

(54) LIGHT GUIDE BLADE WITH COLOR BALANCING STRUCTURES AND BLUE ABSORPTION COMPENSATION FOR LARGE SCREEN LED BACKLIGHT UNIT

(75) Inventors: Lin Li, St. Petersburg, FL (US); Israel J. Morejon, Tampa, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 446 days.

(21) Appl. No.: 12/487,432

(22) Filed: Jun. 18, 2009

(65) Prior Publication Data

US 2009/0316077 A1    Dec. 24, 2009

Related U.S. Application Data

(60) Provisional application No. 61/073,558, filed on Jun. 18, 2008.

(51) Int. Cl.
*G02F 1/1335* (2006.01)
*F21V 5/00* (2006.01)

(52) U.S. Cl. ........... 349/65; 349/109; 349/102; 362/330

(58) Field of Classification Search .............. 349/65, 349/109, 102; 362/330
See application file for complete search history.

(56) References Cited

U.S. PATENT DOCUMENTS 8,016,455 B2 * 9/2011 Paulussen .............. 362/268
2011/0134361 A1 * 6/2011 Ueno et al. ............. 349/62

FOREIGN PATENT DOCUMENTS

JP    2007-67076    * 3/2007

* cited by examiner

*Primary Examiner* — Mike Qi

(57) ABSTRACT

One or more embodiments of the present invention provide apparatuses, methods and systems to form a thin LED backlight unit for a large-screen flat-panel display. The backlight unit is able to achieve improved color mixing within a shorter mixing distance than the conventional art, while maintaining desired brightness uniformity, thereby allowing for a shorter bezel of a display device. One or more embodiments of the present invention include one or more light guides, which, by operating together, provide thin backlight units. High system efficiency is provided by introducing a recycling enhancement component, and uniform color distribution is achieved by incorporating color shift compensation. Multiple light guides are arranged adjacent to one another can offer a progressive scan illumination feature.

20 Claims, 9 Drawing Sheets

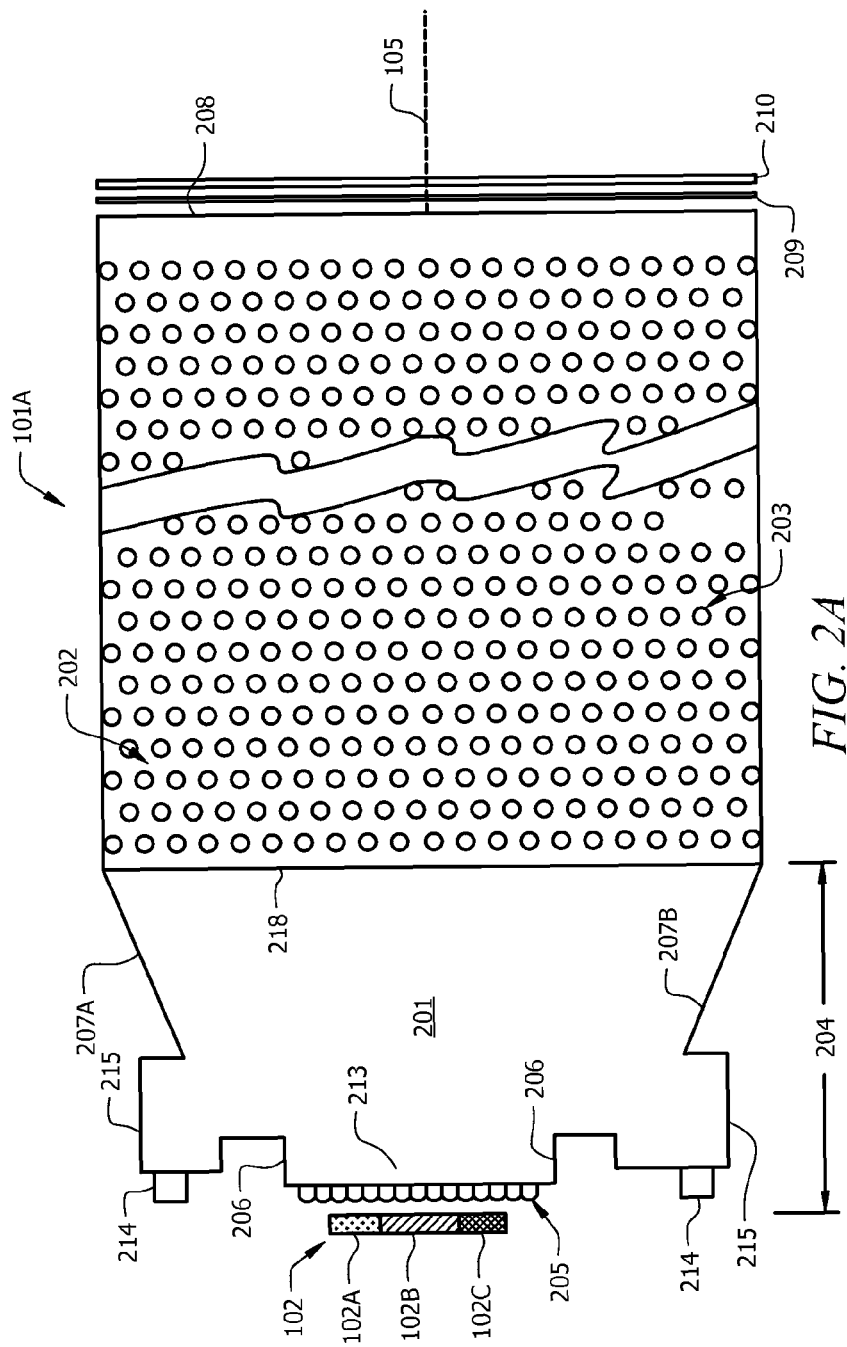
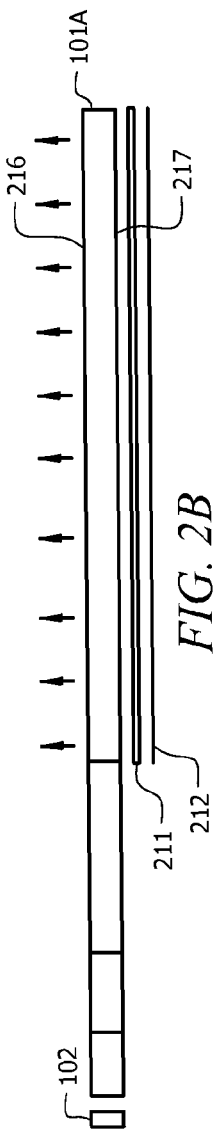
FIG. 2A
FIG. 2B

WITHOUT COLOR BALANCING SURFACES

WITH COLOR BALANCING SURFACES

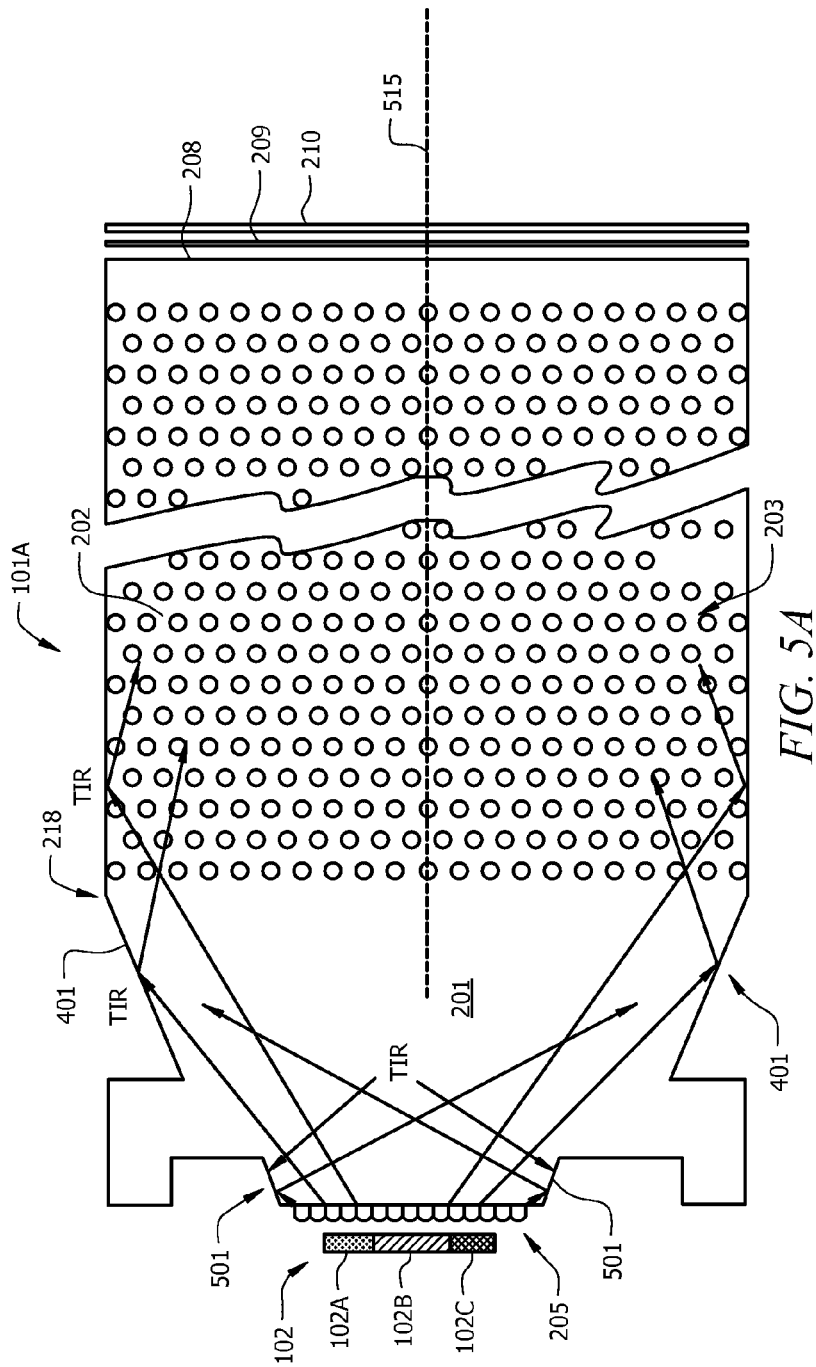
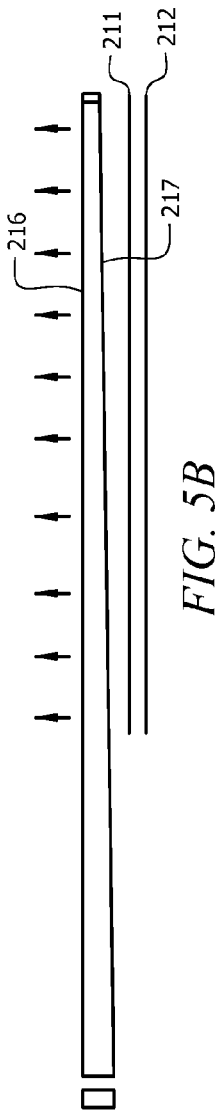
FIG. 5A
FIG. 5B

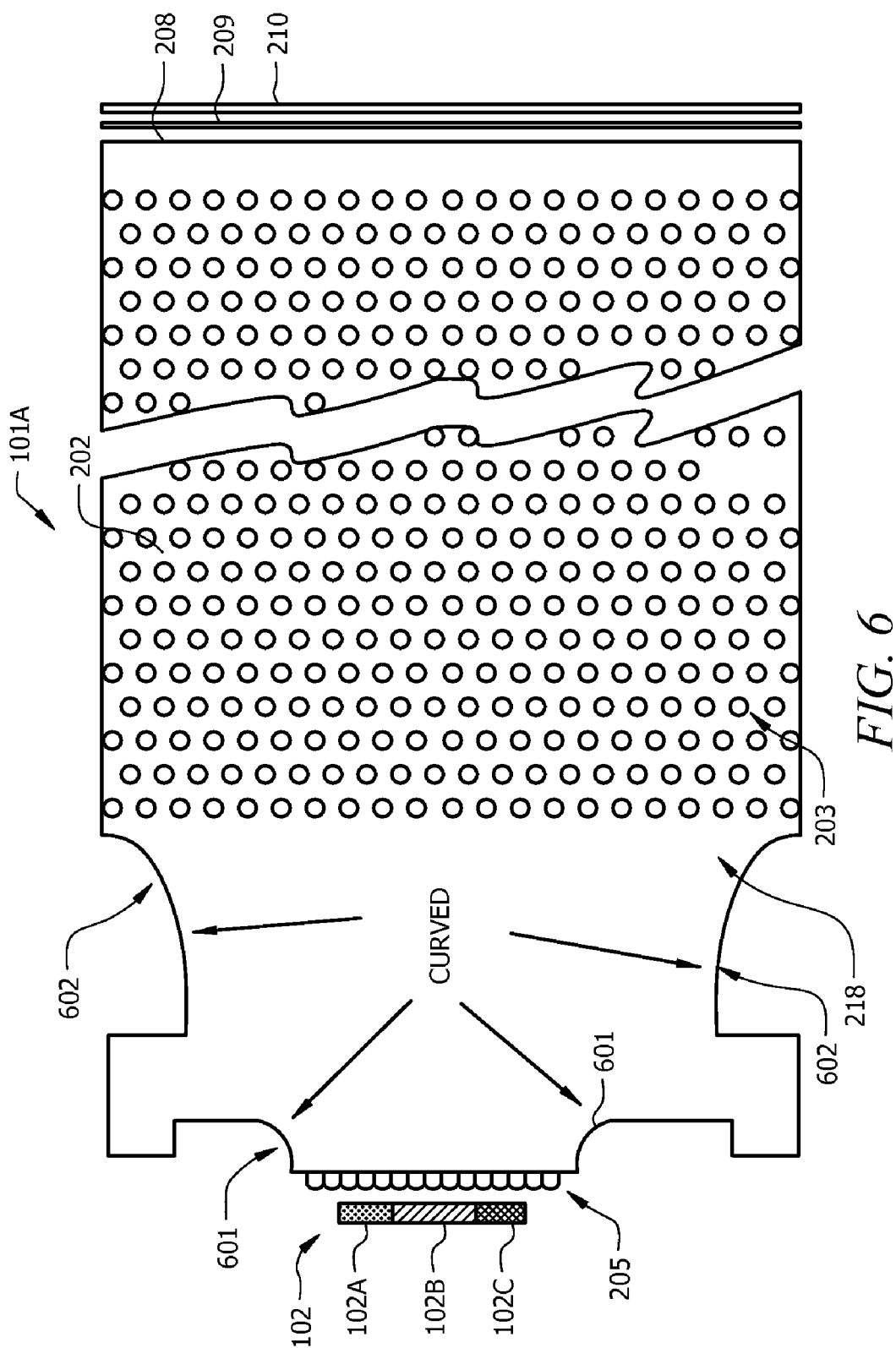

LIGHT GUIDE BLADE WITH COLOR BALANCING STRUCTURES AND BLUE ABSORPTION COMPENSATION FOR LARGE SCREEN LED BACKLIGHT UNIT

CROSS REFERENCE TO RELATED APPLICATIONS

This non-provisional U.S. Patent Application claims the benefit of U.S. Provisional Patent Application No. 61/073,558 entitled "LIGHT GUIDE BLADE WITH COLOR BALANCING STRUCTURES AND BLUE ABSORPTION COMPENSATION FOR LARGE SCREEN LED BACKLIGHT UNIT" filed on Jun. 18, 2008.

BACKGROUND OF THE INVENTION

1. Statement of the Technical Field

This invention pertains to high-efficiency LED-based backlighting devices used for large screen flat panel LCD displays, in particular for light guide blades having short color mixing distance and uniform distribution of brightness and color in the illumination area.

2. Description of the Related Art

Flat panel LCD displays use backlighting to illuminate the panel for making color images visible. The backlighting is conventionally provided by light sources such as CCFL, but light emitting diodes (LEDs) recently have attracted greater attention and effort. LEDs can be located directly on the back surface of a backlight unit, known as direct backlighting. However, an edge-lit arrangement has advantages such as reducing the depth and making the backlight unit thinner by placing LEDs along the sides and using very thin light guides to uniformly distribute light across the LCD panel. While it is easy to implement LEDs which emit white light in a backlighting system, red, green and blue (RGB) LEDs can provide a much wider color gamut and result in superior color displays. In an edge-lit based backlight unit, light rays from small RGB LED light sources need to be coupled into relatively wide light guides. The light guide may also be referred to as a blade or a light blade. The blade has an input surface from which light is coupled into the light guide. The backlight unit may further include a bezel covering the perimeter of the backlight unit.

Light from the LED light sources is coupled into the blade from one or both lateral sides of the blade, the lateral sides being those sides not adjacent to another blade. A transition region known as the color mixing distance is provided between the LEDs and the illumination region of the blade. The color mixing distance allows for mixing of the colors of light from the individual RGB LEDs before the light is extracted out from the blade. It is desirable that the color mixing distance be kept short so that the size of the bezel surrounding the flat panel LCD display can be kept small.

The blades used in backlighting units usually include a substantially transparent bulk plastic material and the light guide transports light along the length of the blade. An example of a bulk material used in injection-molded light blades is acrylic (PMMA) for low cost, lightweight, and less light absorption. The blade will further include micro-structures (i.e., micro-lenses) on the top and/or bottom surfaces to extract light out from the light guide for illuminating the viewing area of the LCD display. In fact, such light blades can also be used as LED illuminators for Solid State Lighting (SSL) applications.

SUMMARY OF THE INVENTION

One or more embodiments of the present invention are able to achieve improved color mixing within a shorter mixing distance than the conventional art, while maintaining a desired uniformity of brightness distribution. A shorter mixing distance allows for a shorter bezel of a display device, which is preferred by consumers.

One or more embodiments of the present invention is a system that includes one or more light guides, which, by operating together, provide a thin backlight unit for a large-screen flat-panel display. The backlight unit has enhanced efficiency and uniform light distribution. The one or more light guides are arranged adjacent to one another, to project light over a relatively large surface area toward the viewers by turning "on" all RGB LEDs at the same time or sequentially turning "on/off" individual RGB LED for scanning-like illumination.

One or more embodiments of the present invention improve the color uniformity produced by a light guide, by use of at least two color-balancing surfaces that are arranged at the entrance of the light guide to balance asymmetrical color distributions from spatially separated RGB LED chips. The brightness uniformity on the screen is achieved by adjusting the sizes and locations of micro structures (such as micro-lenses) on light-emitting surfaces of a light guide. Varying the design of the micro-structures can adjust the brightness distribution of the backlight unit as a whole, by controlling the location and amount of light diverted from the light guide, but not the color uniformity of light emitted from the backlight unit. The color uniformity depends on at least the LED sizes, positions, angular distributions of light emitted from the LEDs, and the coupling structures of the light guide.

One or more embodiments of the present invention may use light containing surfaces in the color balancing area of light guide, in order to improve the color mixing of light within a short distance inside the light guide.

One or more embodiments of the present invention use containing surfaces to prevent light leakage around the sides of a light guide, in order to provide higher efficiency.

One or more embodiments of the present invention may use a dichroic coating at a distal end of the light guide, or a color filter prior to a reflector at the distal end, in order to partially filter red light. The filtered light is re-injected into the distal end, counter-propagating toward a proximal end of the light guide. Filtering red light will help compensate the color shift due to higher blue absorption in the plastic material of the light guide, so that the resulting color distribution is more uniform along the light guide.

One or more embodiments of the present invention may use a recycling enhancement component, such as a high-reflectivity reflector or a Mylar film, in addition to a back reflector underneath the light guide, in order to improve the light recycling efficiency. Such recycling enhancement approach can increase the brightness on the screen without the increase of light output or power of LEDs.

One or more embodiments of the present invention provide a light-transmissive light guide for improving color and brightness uniformity of a display backlight. The light guide is made from an elongated light-transmissive bulk material having a proximal end, a distal end, a top major surface, and a bottom major surface opposing the top major surface. The light guide has an input window on the proximal end transverse to the top and bottom major surfaces, configured to allow light from a plurality of light sources to enter the bulk material. The light guide further has a viewing area of the bulk material comprising a portion of the top and bottom major surfaces on which a plurality of micro-lenses are disposed. The light guide further has a color mixing region of the bulk material adjacent to the viewing area comprising at least one light containing surface transverse to the top and bottom major surfaces, the mixing region configured to mix light from the plurality of light sources and communicate the light, after mixing, to the viewing area. The light guide further has a color balancing region of the bulk material disposed between the input window and the mixing region, comprising at least one color balancing surface transverse to the top and bottom major surfaces, the color balancing region configured to balance color light from at least two of the light sources of different colors and communicate the light, after color balancing, to the mixing region, wherein the color balancing surface is separated from the light containing surface by a distance determined by its specific function and feature.

One or more embodiments of the present invention provides a method for improving color uniformity of a display backlight, the method including steps of coupling light from a plurality of lights sources, through an input window, into an elongated light-transmissive bulk material, balancing the color light from at least two of the plurality of light sources in a color balancing region of the bulk material, following the balancing step, mixing the light in a mixing region of the bulk material, and after the mixing step, emitting the light from the bulk material through a plurality of micro-lenses disposed in a viewing area of the bulk material.

Advantages of the present invention, compared to devices known in the conventional art, include, first, providing a light guide having a relatively shorter color mixing distance. Second, a more uniform color distribution is provided at a portion of viewing area nearest to the LEDs (i.e., the proximal end of the light guide). Third, higher coupling efficiency can be achieved. Fourth, brightness can be improved by using a light recycling enhancement component on the bottom surface of a backlight unit. Fifth, color shift due to blue absorption by the bulk plastic material of the light guide can be properly compensated. The features of the present invention providing these advantages have been integrated with unique light guide structures, thereby providing a low-cost, high-performance and slim LED backlight unit with progressive scanning illumination features.

BRIEF DESCRIPTION OF THE DRAWINGS

Features illustrated in the figures are not drawn to scale unless explicitly stated otherwise, and the relative sizes of certain features may be exaggerated to better illustrate the features. Embodiments will be described with reference to the following figures, in which like numerals represent like items throughout the figures, and in which:

FIG. 2A shows a detailed schematic top view of a portion of a light guide and LEDs, illustrating features of one or more embodiments of the present invention.

FIG. 2B shows a detailed schematic side view of a portion of a light guide and LEDs, illustrating features of one or more embodiments of the present invention.

FIG. 5A is a detailed schematic view of a light guide structure with a color compensator on the end surface.

FIG. 5B is a side schematic view of the light guide of FIG. 5A, tapered in thickness from the beginning to the end.

FIG. 6 is a schematic view of an embodiment having curved light-containing surfaces.

DETAILED DESCRIPTION

Figure 1A:
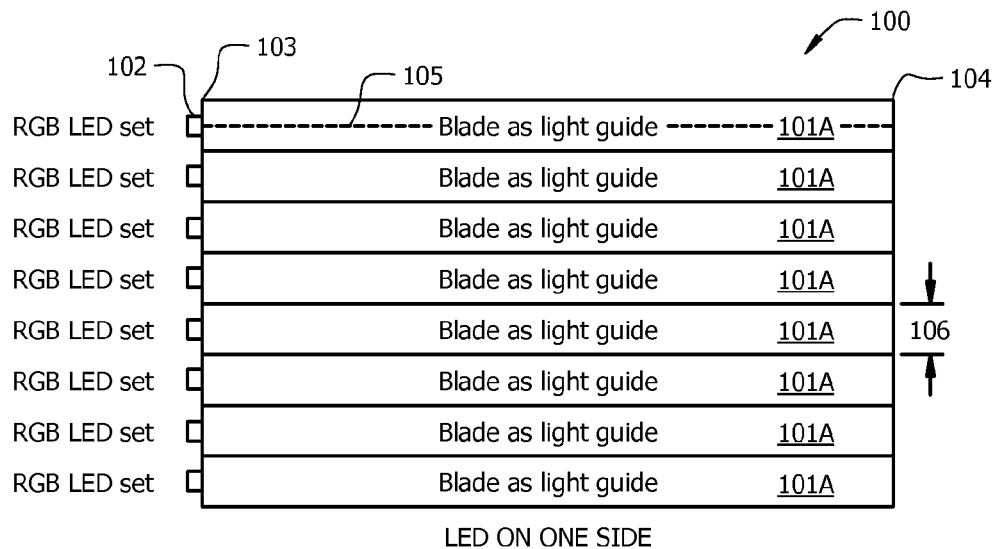
FIG. 1A shows a schematic front view of a plurality of light guides used as a light guide assembly in a LED backlight unit, wherein the light guides are arranged such that the LEDs are disposed on one side of the backlight unit.

FIG. 1A shows a front view of a first exemplary LED backlight unit 100, constructed from a plurality of light guides 101A. Each light guide is relatively flat and thin, so that the overall LED backlight unit 100 can be slim. Each light guide has a set 102 of LEDs on one end of the light guide 101A. The set 102 of LEDs includes at least one LED chip of each of red, green, and blue ("RGB") color. In FIG. 1A, each light guide 101A is arranged such that all sets 102 of LEDs are disposed on one side of the assembled LED backlight unit 100. As referred herein, each light guide 101A has: a proximal end 103 which received light from the set 102 of LEDs; a distal end 104 which is opposite to the proximal end 103; an axis 105 which runs along the length of the light guide 101A from the proximal end 103 to the distal end 104; a top major surface (not marked) parallel to the plane of FIG. 1A; a bottom major surface (not marked) parallel to the plane of FIG. 1A, opposite from the top surface; a width 106 determined by a dimension of the light guide 101A, transverse to the axis 105 and parallel to the plane of FIG. 1A; and a thickness determined by a dimension of the light guide 101A, transverse to the axis 105 and perpendicular to the plane of FIG. 1A.

Each set 102 of RGB LEDs may have three or more surface-mounted RGB chips to provide sufficient light output with required white color when RGB light is well mixed. As one exemplar, the green LED could be approximately 8 mm$^2$ in size, while the red and blue LEDs could be about 4 mm$^2$ in size. These LED sizes allow a light guide thickness to be as little as approximately 3.8 mm. Red LEDs are known to emit light generally within the wavelength range of about 590-660 nm. Green LEDs are known to emit light generally within the wavelength range of about 490-570 nm. Blue LEDs are known to emit light generally within the wavelength range of about 430-500 nm.

Figure 1B:
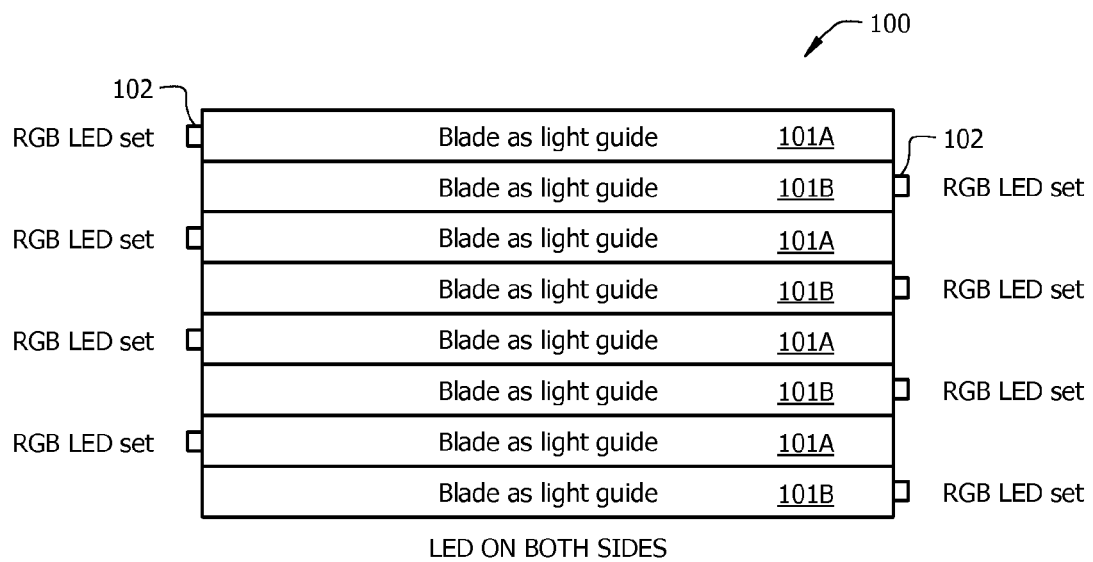
FIG. 1B shows a schematic front view of a plurality of light guides used as a light guide assembly for a LED backlight unit, wherein the light guides are arranged such that some light guides have the LEDs disposed on one side of the backlight unit, and other light guides have the LEDs disposed on an opposite side of the backlight unit.

FIG. 1B shows a front view of a second exemplary LED backlight unit 100, constructed from a first plurality of light guides 101A and a second plurality of light guides 101B. Each light guide 101A is arranged having its set 102 of LEDs disposed on one side of the assembled LED backlight unit 100. Each light guide 101B is arranged having its set 102 of LEDs disposed on an opposite side of the assembled LED backlight unit 100. Light guide 101B may be formed by rotating light guide 101A by 180 degrees. The preferred arrangement is to have the LED backlight unit 100 assembled with alternating light guides 101A and light guides 101B for improving thermal dispersion, but other arrangements are possible.

Because light guides 101A and 101B are different only in orientation, all characteristics of light guide 101A that are described below will apply equally to light guide 101B.

Generally, each light guide 101A uses one LED chip, instead of a plurality of LEDs, for each color. Multiple LEDs sources increase the cost and are more difficult to manage in order to produce a desired white color. Each RGB LED chip could be turned on/off sequentially so that each light guide could provide a specific color band to light a corresponding zone on a large screen LCD panel. This multi-blade LED backlight configuration can offer progressive scanning illumination function.

FIG. 2A shows a detailed top schematic view of a portion of light guide 101A and illustrating one or more features of the present invention. Light guide 101A includes a color mixing region 201 that includes light shaping features described in further detail below. The color mixing region 201 is characterized by a color mixing distance 204. Typical dimensions for color mixing region 201 are about 1"-1.4" for a light guide having a height (in the plane of FIG. 2A) of 3".

Mounted to the side of color mixing region 201 is a set 102 of LEDs. The set 102 is depicted here as one blue LED 102A, one green LED 102B, and one red LED 102C, but persons of skill in the art will recognize that additional quantities of LEDs and/or varying ratios of the different colors of LEDs, may be used to achieve different desired brightnesses or color balances. The individual LEDs will ordinarily be arranged in an elongated pattern in one direction, such as one row or a small number of rows, in order to help maintain the overall flat and thin shape of light guide 101A. LED light sources 102A-102C are placed very close to the light guide 101A in order to improve the light coupling efficiency. A lens array 205 is disposed on the entrance of a light guide. A reflective surface (not shown) may be provided adjacent to the set 102 of LEDs, opposite lens array 205, in order to improve recycling of light toward lens array 205. The lens or prism array 205 formed on the input surface of light guide 101A expands light beam and increase the divergence of light rays inside the light guide. For instance, lens array 205 may be a lenticular lens array. A wider divergent angle after the lens array 205 will tend to promote more color mixing. An anti-reflective ("AR") coating (not shown) may be used to improve the light coupling of the LEDs 102A-102C to the lens array 205 with reduced reflection loss. Mechanically, positioning pins 214 mount the flange area 215 to a mounting surface (not shown) for accurate assembling.

As light emerges from the lens array 205 into color mixing region 201, the color will have a relatively strong dependency upon the linear position along the length of the lens array 205. This is because the color of light emerging from any portion of the lens array 205 will be dominated by the color of the LED closest to that portion of the lens array 205. Color mixing region 201, as described below, is the region in which the colors from the LEDs are mixed in order to provide a more uniform color balance and more uniform intensity balance prior to the light entering a proximal end 218 of viewing area 202 of light guide 101A.

Color mixing region 201 includes features of one or more embodiments of the present invention that improve the mixing. The set 102 of LEDs and the lens array 205 are mounted adjacent to a protruding portion 213, which projects from the interior of color mixing region 201. The protruding portion has one or more sidewalls forming color balancing surfaces 206. As shown in FIG. 2A, a pair of color balancing surfaces 206 are specially provided, one surface at each end of lens array 205. The depth of protruding portion 213, measured in a direction parallel to the axis 105, is approximately 3 mm. LED dies are mounted with a typical tolerance of about ±25-50 microns.

An active area of color mixing region 201 changes width from approximately the protruding portion 213 to a width determined by the width of light guide 101A, the widths being measured in the direction shown by width 106 in FIG. 1. Along the transition there may be provided one or more light-containing surfaces 207, which act to reduce light leakage by containing the light within light guide 101A, and to direct the contained light down the length of light guide 101A for proper light distribution. Efficiency and also uniformity are thereby improved. As shown in FIG. 2A, a pair of light-containing surfaces 207A, 207B are consequently provided, one surface at each lateral side of the color mixing region 201, transverse to axis 105. Light containment provided by the light-containing surfaces 207A, 207B is discussed below.

Because of the difference in the refractive index of the bulk material of light guide 101A and the medium that it is immersed in (usually air), there is a critical angle with respect to the perpendicular of a surface formed at a boundary between the bulk material and the medium. At angles less than the critical angle (i.e., close to perpendicular), light may be able to pass through the surface. At angles greater than the critical angle (i.e., shallow angles with respect to the surface, and away from the perpendicular), light will be totally reflected by the surface. This condition of total reflectance is called total internal reflection (TIR).

Due to the width of light guide 101A, light from LEDs 102A-102C may strike the lateral edge of light guide 101A near the proximal end at an angle less than the critical angle, and thereby leak from light guide 101A, unless the lateral edges are angled or shaped to provide a TIR condition. The angle of light containing surfaces 207A, 207B with respect to axis 105 is selected such that light rays approaching light containing surfaces 207A, 207B impact said surfaces at a relatively shallow angle with respect to the normal (i.e., the perpendicular) of light containing surfaces 207A, 207B. In one embodiment, the light containing surfaces 207A, 207B are flat surfaces disposed within a predetermined range of angles with respect to axis 105, typically about 30-41 degrees, in order to provide a TIR condition at light containing surfaces 207A, 207B, such that light is internally reflected from light containing surfaces 207A, 207B rather than passes through them.

Adjacent to color mixing region 201 is a viewing area 202, the viewing area being the area of light guide 101A which provides illumination to the viewable screen of a LCD display. Viewing area 202 is formed from a portion of the top major surface 216 and bottom major surface 217 of light guide 101A, and is the portion of the light guide that resides behind a portion of electronic display where an image is generally presented for viewing. Disposed on both the top and bottom major surfaces 216, 217 of viewing area 202 includes a micro-lens array 203. Each micro-lens allows a portion of light to escape from the interior of the light guide 101A. A micro-lens as known in the art can consist of a roughened area, having a micro-structure which breaks the TIR condition, thereby allowing light to be locally extracted out from the light guide.

With respect to the inner side of the top and bottom major surfaces 216, 217 of light guide 101A, the portions of viewing area 202 in between the individual micro-lenses is TIR surface, and will promote containment of light inside the light guide 101A until the light is emitted through either a micro-lens or through the distal end 208 of the light guide 101A. The thickness of light guide 101A is either substantially constant or can be slightly tapered to establish a TIR condition along the entire length of light guide 101A. Therefore, no special shaping or optical treatment is needed on the top and bottom major surfaces 216, 217 in order to guide the light inside a blade. The TIR condition on the top and bottom major surfaces 216, 217 is broken only by the micro-lenses.

A design concept for achieving short color mixing distance is to design proper light guide structures in color mixing region 201 such that RGB color light is well mixed to form desired white light when light-extracting micro-lens pattern starts for the viewing area 202. The brightness distribution within light guide 101A may not be uniform, but the perceived brightness of light emitted through the micro-lens array 203 will be substantially balanced over the proximal end of viewing area 202 by designing individual micro-lenses with a size and location that is matched to the intensity distribution within light guide 101A at the location of the individual micro-lens. In contrast, for conventional designs known in the art, micro-lenses are placed only at locations where both the brightness and color are relatively uniform, thus limiting the location of a viewing area formed from the micro-lenses. The conventional designs result in a distance that is too long between the light source and the viewing area. This is undesirable to users and manufacturers of displays such as flat panel LCD TVs due to too large bezels.

The perceived uniformity of light brightness provided to illuminate a display relates to optimal usage of available light. It is acceptable if the central region of a display is designed to be brighter than the periphery of the display (i.e., edges and corners) by about 10%-20%. From the center to the periphery, actual brightness gradually and symmetrically decreases, following a specified profile, so that the brightness variation across the screen is not noticeable and visible by the viewers.

Features of the micro-lens array 203 of one or more embodiments of the present invention may be varied to control the extraction of light from within the light blade, such as the size of a micro-lens; density of micro-lenses; and placement of micro-lenses used to form an array. For equivalent light intensities within a light guide, a larger diameter micro-lens will emit more light than a small diameter micro-lens, due to the difference in scattering or diffusing areas. Similarly, for equivalent light intensities within a light guide, a greater density of micro-lens of a predetermined size will emit more light over an area than a smaller density of micro-lens of the same predetermined size. The features may also vary as a function of distance along the length of light guide 101A. For instance, near the proximal end 218 of viewing area 202, light intensity within the light blade initially will be greater along the lateral edges because of reflections than in the center of the light blade. Therefore, the sizes of micro-lenses are correspondingly adjusted for removing hot spots and providing uniform brightness distribution. As light propagates down the light guide toward the distal end 208, light mixing arising from internal reflections will cause the light intensity to become more uniform in the width direction. Light extraction by micro-lenses through the light guide 101A causes the light intensity propagating within the light guide 101A to decrease as distance from the LEDs increases.

To compensate for the variations of light intensity within the light guide 101A, and to provide a perceived uniformity of brightness over a viewing area, the diameter of micro-lenses may vary within the range of about 0.1 mm diameter to about 2.0 mm diameter, with the larger micro-lenses allowing more light to be released. The size of a micro-lens at a predetermined location, the density of micro-lenses, and their placement within array 203 is designed by simulating the light intensity distribution within the light guide 101A at the predetermined location, and determining micro-lens sizes that provide a desired brightness profile resulting in a perceived uniform brightness.

Manufacturing tolerances and imperfections will affect the actual brightness distribution profile. Therefore, iterative processes may be used during manufacturing, such that an as-manufactured brightness profile can be measured, and the size of individual micro-lenses are then adjusted (i.e., adapted) to provide a new-iteration as-manufactured brightness profile that is closer to the desired brightness profile. An exemplary process uses a diamond-turning machine, under the control of a CAD software program, to produce optimal micro-lens patterns.

Although the plastic material used in the light guide 101A is substantially transparent, it commonly has an optical attenuation per unit length that varies with wavelength, absorbing blue (i.e., shorter) wavelengths more than red (i.e., longer) wavelengths. Light which passes entirely through light guide 101A without being emitted through micro-lens array 203 may be emitted as end-light through distal end 208. The wavelength-dependent absorption of the bulk material produces end-light that typically has a reddish color compared to light at the proximal end 218 of the light guide 101A. Re-injecting this end-light back into the light guide 101A so that such reflected light has another opportunity to be emitted through the micro-lens array 203 will improve the brightness of the viewing area 202.

Because in large screen applications the light guides should be relatively long, the reddish color shift along the light guides may be particularly noticeable if uncompensated, such that a viewer of the LED display may observe a perceptible shift in the color associated with displayed images. It is critical that the color shift be reduced so that color will be very uniform across the screen.

In order to compensate for this reddish color shift, a wavelength selectivity is applied to the end-light before it is injected back into the distal end 208. The wavelength selectivity may take the form of, for instance, a color filter 209 which selectively filters out at least a portion of light at the red end of the color spectrum, red light generally having a wavelength of about 600-680 nm. Once-filtered light that passes through color filter 209 is reflected by reflector 210, and passes through color filter 209 again to be injected into distal end 208 as twice-filtered light. Other embodiments of wavelength selectivity will be discussed below.

FIG. 2B shows a side profile view of light guide 101A. This view depicts a white reflector 211 disposed underneath the bottom major surface 217 of light guide 101A, opposite from the top major surface 216 of light guide 101A, where the viewing area 202 is disposed. White reflector 211 operates to reflect back light towards an LCD panel over viewing area 202. It would be preferable for white reflector 211 to reflect all light incident upon it, but the composition of a conventional white reflector 211 allows a portion of the light to pass though. Therefore, to recycle light and to improve system efficiency of a backlight unit, a recycling enhancement film 212 is added. The improvement in efficiency and brightness afforded by brightness enhancement film 212 allows for reduced power consumption and correspondingly reduced heat generated by LED chips, which in turn improves light output from LEDs.

Recycling enhancement film 212 typically may be formed from one or more layers of reflective films such as Mylar.

Recycling enhancement film 212 may also be formed from a reflective surface integrated together a white diffuse reflector. FIG. 2B is drawn with a gap between bottom surface 217, white reflector 211, and film 212 for sake of clarity, but it will be understood that ordinarily the bottom surface 217, white reflector 211, and film 212 abut each other with no intended gap.

Figure 3A:
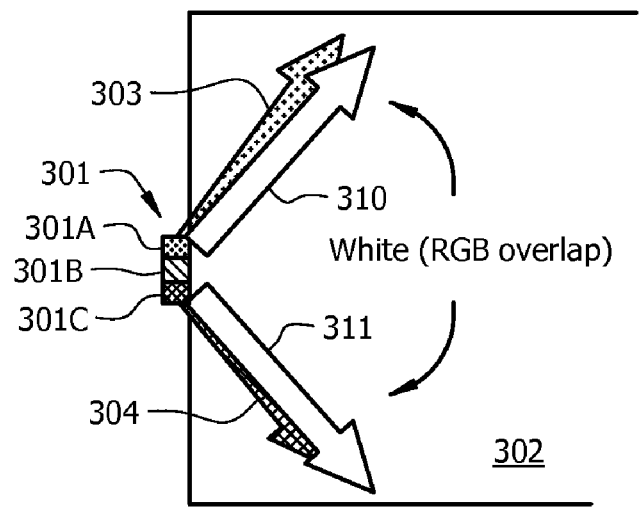
FIG. 3A is a ray trace diagram illustrating light propagation in a light guide without color balancing surfaces.

FIG. 3A presents a top schematic view and ray trace of a conventional light blade without the color balancing structures of the present invention. Light from LED set 301 is injected into light guide 302. The LED set 301 is placed very close to the light guide 302. The specific order of LEDs 301A-301C within LED set 301 is illustrative, and the LEDs can be placed in other orders. Although LEDs 301A-301C provide a combined white light in a central portion 305, the edges of the combined light will have an undesirable coloration based on the relative positioning of the spatially separated RGB LEDs. For instance, the blue spectral components of light ray 303 will be accentuated because it is relatively closer to blue LED 301A and removed from red LED 301C. Conversely, the red spectral components of light ray 304 will be accentuated because it is relatively closer to red LED 301C and removed from blue LED 301A. Light rays 310 and 311 represent the range of light rays, near the center of the field of view of LEDs 301A-301C, which have enough overlap of the light from LEDs 301A-301C in order to produce a relatively white light. This range of light rays may also be referred herein as a composite field of view.

Figure 3B:
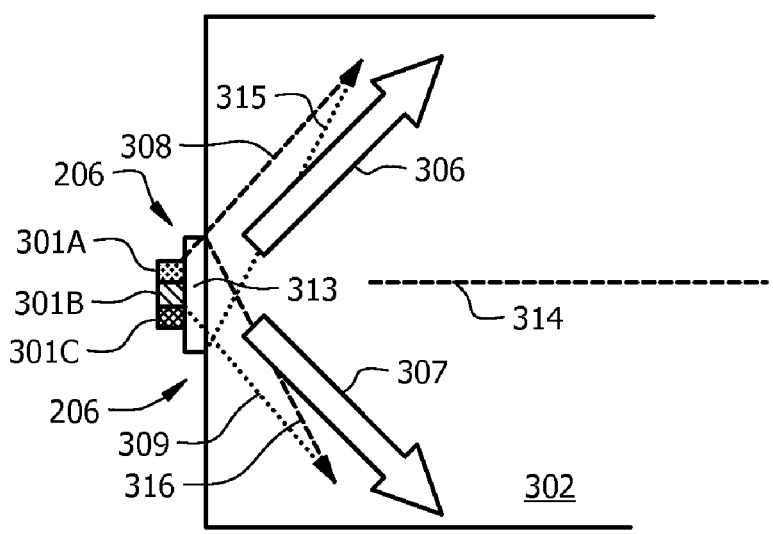
FIG. 3B is a ray trace diagram illustrating light propagation in a light guide with balanced color light distribution.

FIG. 3B presents a top schematic view and ray trace of a light blade incorporating the color balancing surface 206 feature of the present invention. LEDs 301A-301C are mounted adjacent to a projection 313 in light guide 302. Each LED 301A-301C emits light throughout a field of view, and the LEDs 301A-301C together emit light throughout a composite field of view. Two sides of the projection 313 in the plane of FIG. 3B, that are adjacent to the side having LEDs 301A-301C attached, form a pair of color balancing surfaces 206.

The ray traces of FIG. 3B illustrate the effect of the color balancing surfaces 206. In the following discussion, left and right are with respect to axis 314 of light guide 302. Rays 306 and 307 are projected near the center of the composite field of view of LEDs 301A-301C, and as a result rays 306 and 307 contain substantial light contributions from each of LEDs 301A-301C, producing relatively white light.

Ray 308 is emitted toward a left edge of the composite field of view, and therefore contains a relatively greater contribution of light from the left-most LED 301A, as compared to rays 306 and 309. Because LED 301A is shown as a blue LED, ray 308 is a bluish ray. Conversely, ray 309 is emitted toward a right edge of the composite field of view, and therefore contains a relatively greater contribution of light from the right-most LED 301C, as compared to rays 307 and 308. Because LED 301C is shown as a red LED, ray 309 is a reddish ray.

Ray 316 is a blue balancing ray that originates from blue LED 301A and travels toward the left side, but which reflects from color balancing surface 206 and is redirected toward the right side. After a short distance from the LED 301A-301C, the blue balancing ray 316 combines with the direct reddish ray 309, and with a green ray (not shown) from the central LED 301B, to produce a light at the far right of the composite field of view that is more color balanced than without the contribution from the blue balancing ray 316.

Conversely, ray 315 is a red balancing ray that originates from red LED 301C and travels toward the right side, but which reflects from color balancing surface 206 and is redirected toward the left side. After a short distance from the LED 301A-301C, the red balancing ray 315 combines with the blue balancing ray 316, and with a green ray (not shown) from the central LED 301B, to produce a light at the far left of the composite field of view that is more color balanced than without the contribution from the red balancing ray 315. The effect of blue balancing ray 316 and red balancing ray 315 is to produce better color mixing at the left and right edges of the composite field of view.

Figure 4:
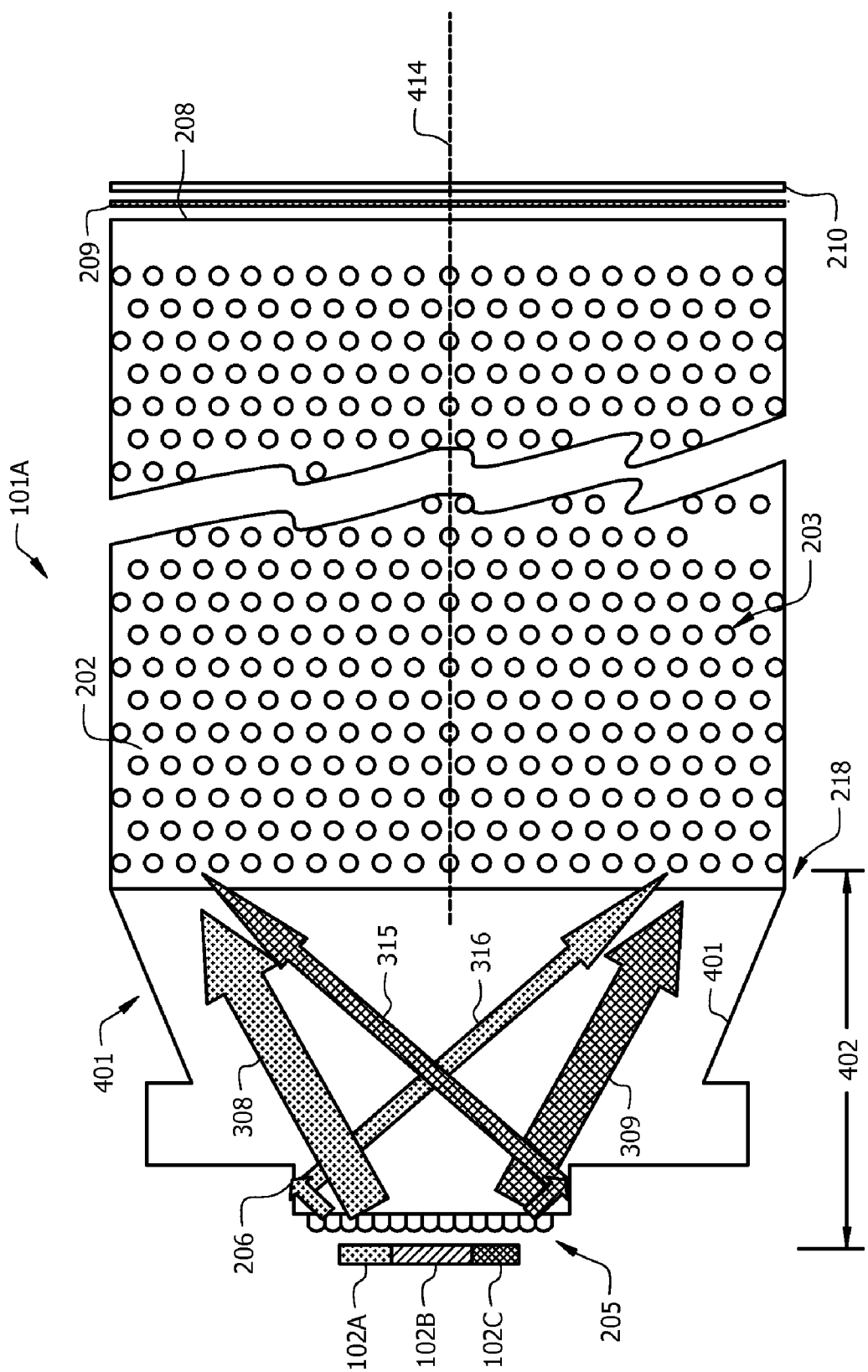
FIG. 4 is a ray trace diagram illustrating color light balancing concept in the beginning portion of a light guide.

FIG. 4 is a ray trace diagram illustrating light mixing within the color mixing distance 402, showing the relative contributions of the direct and reflected rays. Left and right again are with respect to axis 414 of light guide 101A. On the left side, within the color mixing distance 402, direct bluish ray 308 combines with a relatively smaller reflected reddish ray 315 such that the color balance is improved by the time the rays enter viewing area 202. Conversely, on the right side, within the color mixing distance 402, direct reddish ray 309 combines with a relatively smaller reflected bluish ray 316 such that the color balance is improved by the time the rays enter the viewing area 202. Light containing surfaces 401 are illustrated which improve the coupling of light into the viewing area 202, by reflecting light incident upon light containing surfaces 401 toward the viewing area 202. Light containing surfaces 401 are illustrated as flat surfaces, but other shapes may be used to improve the uniformity of light distribution inside the light guide.

As noted with respect to FIG. 2, lens array 205 is a microstructure on the entrance surface of the light guide. Lens array 205 operates to expand the divergent angle of light propagating inside the light guide 101A. Typically, the divergent angle in one direction can be increased by lens array 205 from about ±42 degrees to about ±60-80 degrees in the bulk material.

FIG. 5A is a top view ray trace diagram illustrating the improvement achievable by use of total internal reflection ("TIR") surfaces and a recycling enhancement film. The TIR surfaces are formed on one or more of the internal lateral surfaces of light guide 101, in both the color mixing region 201 and the viewing area 202, such as color balancing surfaces 501 and light containing surfaces 401. The TIR surfaces may also be formed on at least a portion of the internal side of top major surface 216 and/or at least a portion of the internal side of bottom major surface 217 of the light guide 101A, as shown in FIG. 5B. The TIR surfaces improve the efficiency of injecting light into the viewing area 202 of light guide 101A.

FIG. 5A also illustrates the color balancing surfaces 501 angled outward to form an acute angle with respect to axis 515 in order to better direct the reflected rays toward the viewing area 202 of light guide 101, thereby improving the coupling of light into the viewing area 202. A portion of the light from the LEDs 102A-102C, both direct and reflected light, will reflect from light containing surfaces and be further directed toward the viewing area 202.

FIG. 5B is a side view of light guide 101A, similar to the side view illustrated in FIG. 2B, but the bottom major surface 217 of light guide 101A is slightly angled (tapered) corresponding to the top major surface 216 of light guide 101A.

FIG. 6 is a schematic view of an embodiment of the present invention having curved light containing surfaces. Both the color balancing surface 601 and the light containing surface 602 are shown as curved, but embodiments of the invention are operable with differently shaped surfaces such as combining a curved color balancing surface 601 with a flat light containing surface 401, or a faceted shape. Surfaces 602 are convexly shaped with respect to the interior of light guide 101A. The convex shape of surfaces 602 is selected to reflect light toward viewing area 202, and light rays from set 102 of LEDs strikes surfaces 602 at a sufficient angle that surfaces 602 are a TIR reflective surface. However, compared to planar surfaces such as the planar color balancing surface 501 and the flat light containing surface 401, curved surfaces 601 and 602 provide improved mixing of light because the reflected light is reflected over a relatively wider range of angles than the light reflected from the planar surfaces.

Figure 7:
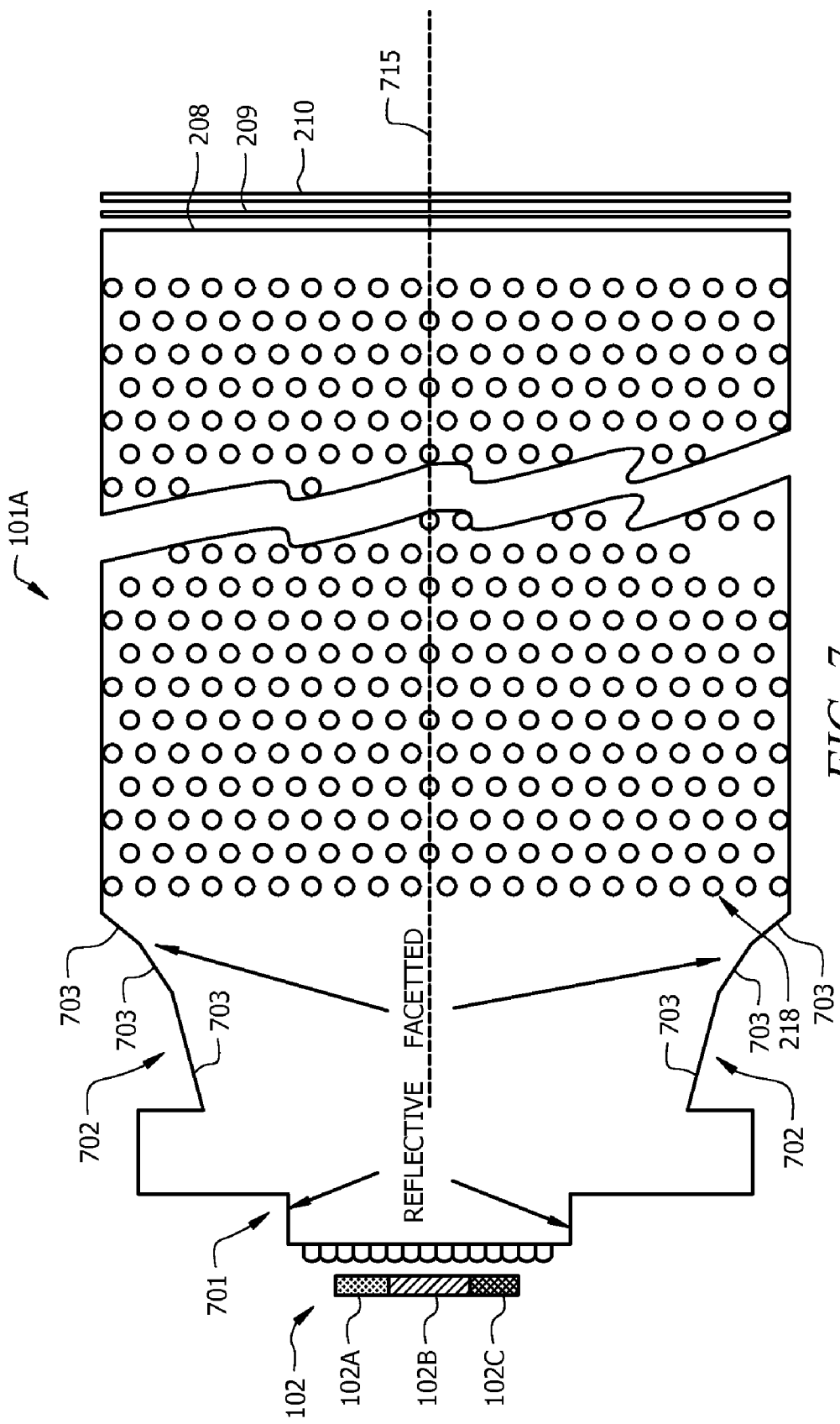
FIG. 7 is a schematic view of an embodiment having faceted light-containing surfaces.

FIG. 7 is a schematic view of another embodiment of the present invention having shaped light containing surfaces 702. In this embodiment the shaped light containing surfaces 702 include a plurality of facets 703. The facets 703 are generally arranged to provide a convex surface shape, as viewed from inside the light guide 101A, similar to FIG. 6. Color balancing surfaces 701 are shown as substantially parallel to axis 715 of light guide 101A, but other shapes for the color balancing may be used together with light containing surfaces 702, such as curved surface 601 or angled surface 501.

Figure 8A:
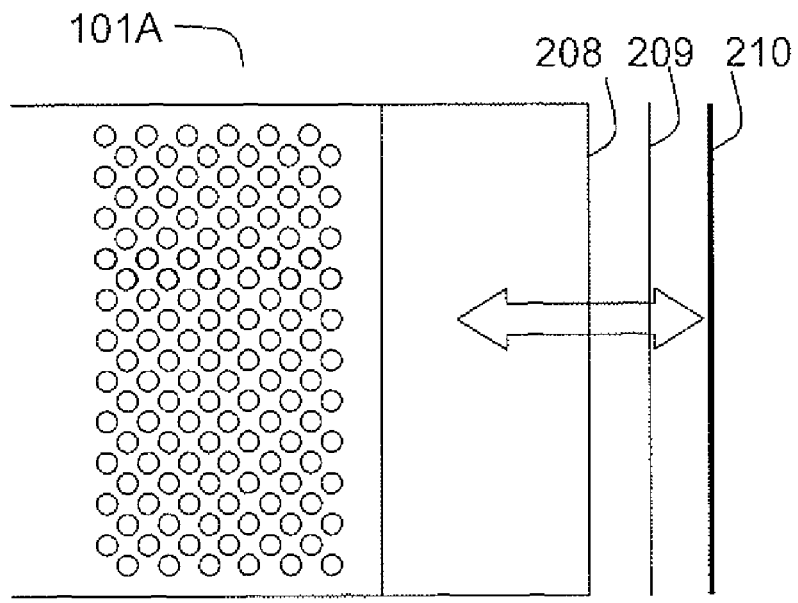
FIG. 8A is an enlarged schematic view of an embodiment having a blue light compensating feature at the distal end of the light guide.

The wavelength-dependent absorption of the bulk plastic material of light guide 101A typically attenuates the shorter (i.e., blue) wavelengths more so than longer (i.e., red) wavelengths. Uncompensated, this tends to produce a reddish tinge to light emitted around the distal end of the micro-lens array 203. The light emitted from distal end 208 of the light guide will also have a reddish tinge. FIG. 8A illustrates a first embodiment of a color compensation scheme. FIG. 8A shows a color filter 209 positioned beyond distal end 208, with reflector 210 positioned beyond color filter 209. Color filter 209 is designed to selectively attenuate longer wavelengths (i.e., red color) compared to shorter wavelengths (i.e., blue). The filtered light is reflected by reflector 210, filtered a second time by color filter 209, and reintroduced into distal end 208 of the light guide 101A, counter-propagating toward the proximal end 218 of light guide 101A. The twice-filtered light will have a blue to cyan tinge, cyan being the combination of blue and green light. The twice-filtered, counter-propagating light combines with the reddish-tinged propagating light to produce a compensated light emitted from micro-lenses positioned near the distal end of the micro-lens array 203, the compensated light having a more balanced color spectrum that is a closer approximation of white light comparing to that at the beginning portion of the light guide.

Figure 8B:
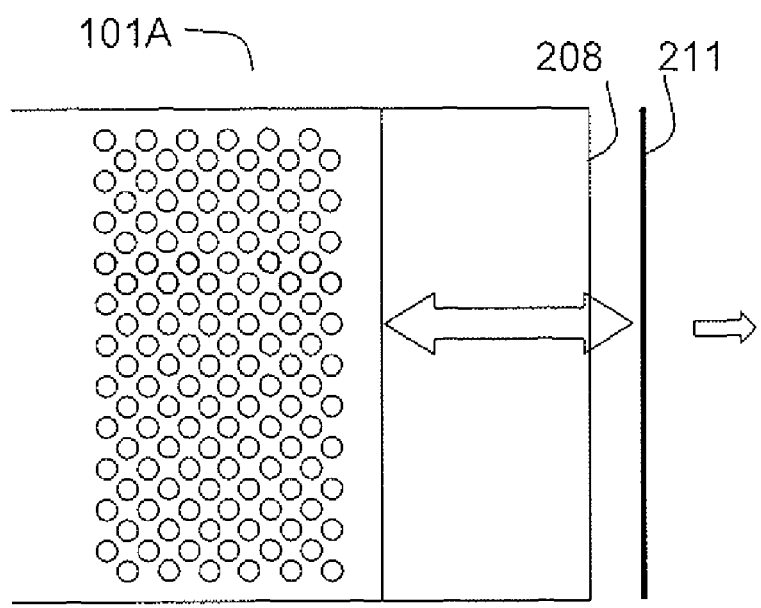
FIG. 8B is a schematic view of another embodiment having a blue light compensating feature at the distal end of the light guide.

FIG. 8B illustrates a second embodiment of a color compensation scheme. FIG. 8B shows a dichroic mirror 211 positioned beyond distal end 208. Dichroic mirror 211 is designed to selectively reflect shorter wavelengths (i.e., blue) compared to longer wavelengths (i.e., red color). Light not reflected by dichroic mirror 211 passes through dichroic mirror 211 and is damped. The reflected light is reintroduced into distal end 208 of the light guide 101A, counter-propagating toward the proximal end 218 of light guide 101A. The reflected light will have a blue to cyan tinge, cyan being the combination of blue and green light. The reflected, counter-propagating light combines with the reddish-tinged propagating light to produce a compensated light emitted near the distal end of the micro-lens array 203. The compensated light has a more balanced color spectrum so that the color distribution is more uniform across the light guide.

Figure 8C:
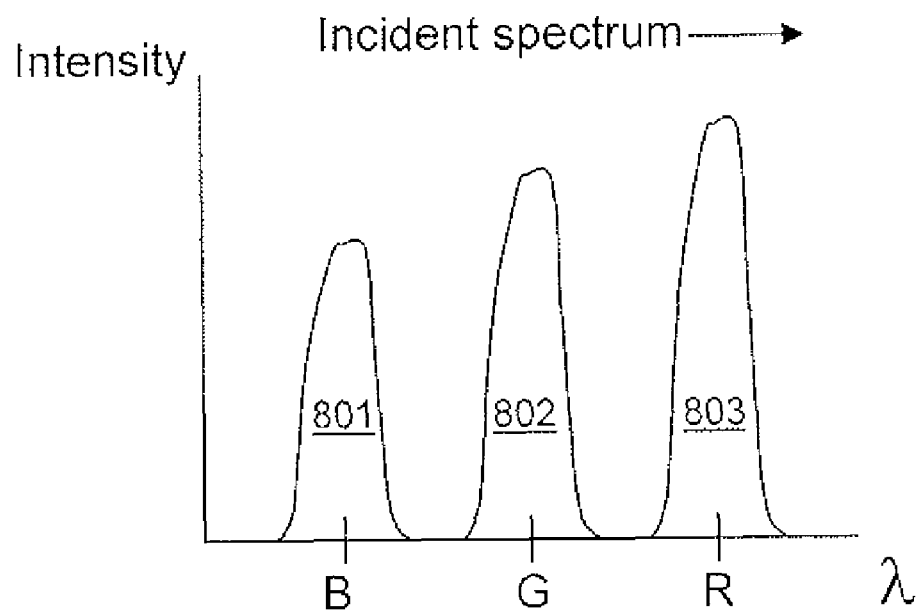
FIG. 8C illustrates an exemplary spectrum of incident light emitted from the distal end after propagating along the light guide.

FIG. 8C qualitatively illustrates the spectrum of light emitted from distal end 208. Certain features such as relative intensity and wavelength separation may be exaggerated for clarity. The wavelength-dependent absorption of the bulk material of light-guide 101A produces a relatively stronger red spectral component 803 than blue spectral component 801, compared to the spectrum (not shown) of the light injected into the proximal end 218 of the light guide. FIG. 8C assumes that a spectrum having substantially equal R, G, B components has been injected into the proximal end 218 of the light guide.

Figure 8D:
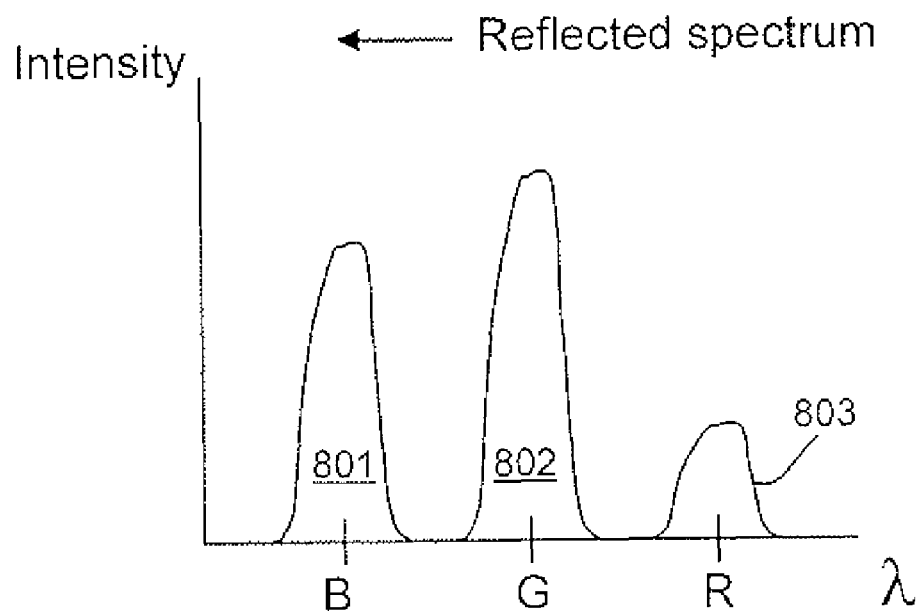
FIG. 8D illustrates an exemplary spectrum of reflected light re-injected into the distal end of the light guide to counter-propagate along the light guide.

FIG. 8D qualitatively illustrates the spectrum of light reintroduced into distal end 208. Certain features such as relative intensity and wavelength separation may be exaggerated for clarity. The red spectral component 803 has been attenuated compared to the blue component 801 and the green component 802.

A drawback of a low-cost implementation of the first and second embodiments of the color compensation scheme, i.e., implementations using low-cost commercially available parts, is that the selection of red filtering in either filter 209 or dichroic mirror 211 may be limited. This drawback may be overcome by a third embodiment of a color compensation scheme (not shown) that may be formed from a combination of one or several pieces of reflective films and the first or second embodiments. In the third embodiment, a first portion of distal end 208 will be covered by a wavelength-insensitive mirror or reflective film so that there is not color compensation in this portion of distal end 208, and a second portion of the distal end 208 may be covered by the first or second embodiment of the color compensation scheme. Specific ratios of usage between the mirror and the first or second embodiments, and of what portions of the distal end 208 that are covered by reflective films and the first or second embodiments may be tailored to provide a desired red filtering response.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A light-transmissive light guide with high coupling efficiency, short color mixing distance and uniform light distribution for LCD backlight units, comprising:
an elongated light-transmissive bulk material having a proximal end, a distal end, a top major surface, and a bottom major surface opposing said top major surface;

an input window on said proximal end transverse to said top and bottom major surfaces, configured to allow light from a plurality of light sources to enter the bulk material;

a viewing area of the bulk material comprising a portion of said top and bottom major surfaces on which a plurality of micro-lenses are disposed;

a mixing region of the bulk material adjacent to said viewing area comprising at least one light containing surface transverse to said top and bottom major surfaces, said mixing region configured to mix light from said plurality of light sources and communicate said light, after mixing, to said viewing area; and a color balancing region of the bulk material disposed between said input window and said mixing region, comprising at least one color balancing surface transverse to said top and bottom major surfaces, said color balancing region configured to balance light from at least two of said light sources of different colors and communicate said light, after color balancing, to said mixing region, wherein said color balancing surface is separated from said light containing surface by a predetermined distance.

2. The light-transmissive light guide according to claim 1, wherein said color balancing surface has a surface orientation different from said light containing surface.

3. The light-transmissive light guide according to claim 1, wherein said input window on said proximal end further comprises a lens array to expand divergent angles of light rays in one direction inside the said bulk material.

4. The light-transmissive light guide according to claim 1, wherein said elongated light transmissive bulk material has a central axis extending from said proximal end to said distal end, and said input window is transverse to said central axis.

5. The light transmissive light guide according to claim 4, wherein said light containing surface forms an acute angle with respect to said central axis.

6. The light transmissive light guide according to claim 5, wherein said light containing surface is multi-faceted.

7. The light transmissive light guide according to claim 4, wherein said at least one color balancing surface extends from said input window and is aligned with said central axis.

8. The light transmissive light guide according to claim 4, wherein said at least one color balancing surface extends from said input window and forms an acute angle relative to said central axis.

9. The light-transmissive light guide according to claim 1, wherein said light guide has an uneven intensity distribution of light near a proximal portion of said viewing area, and wherein said micro-lenses are selectively distributed on said top and bottom major surfaces in a predetermined pattern that compensates for said uneven intensity distribution of light to reduce the color mixing distance.

10. The light transmissive light guide according to claim 1, further comprising a redirector to re-direct selected wavelengths of light exiting said distal end back into said bulk material.

11. The light transmissive light guide according to claim 10, wherein said redirector to re-direct selected wavelengths comprises a reflector.

12. The light transmissive light guide according to claim 11, wherein said reflector is a dichroic mirror.

13. The light transmissive light guide according to claim 10, wherein said redirector to re-direct selected wavelengths further comprises a color filter.

14. The light transmissive light guide according to claim 10, wherein said redirector to re-direct selected wavelengths further comprises:

one or more wavelength-insensitive reflectors disposed adjacent to a first portion of the distal end; and at least one of color filters and dichroic mirrors, disposed adjacent to a second portion of the distal end.

15. A method for improving system efficiency of a display backlight, comprising:

communicating light from a plurality of lights sources, through an input window, into an elongated light-transmissive bulk material;

balancing said light from at least two of said plurality of light sources in a color balancing region of said bulk material;

following said balancing step, mixing said light in a mixing region of said bulk material; and subsequent to said mixing step, emitting said light from the bulk material through a plurality of micro-lenses disposed in a viewing area of the bulk material.

16. The light method according to claim 15, further comprising the step of recycling light that exits said bottom major surface back towards the top major surface, by use of a brightness enhancing film.

17. The light method according to claim 15, subsequent to said emitting step, further comprising re-directing light exiting said bulk material back into said bulk material.

18. The light method according to claim 17, subsequent to said emitting step, wherein selected wavelengths of the light exiting said bulk material are re-directed back into said bulk material.

19. The light method according to claim 15, prior to said emitting step, selectively positioning adapted micro-lenses in a viewing area of the bulk material.

20. The light method according to claim 15, wherein said balancing step further comprises redirecting a first unbalanced light toward a second unbalanced light.

* * * * *